(12) United States Patent
Wilcox

(10) Patent No.: US 12,201,070 B2
(45) Date of Patent: Jan. 21, 2025

(54) MODULAR AEROPONIC GARDEN SYSTEM

(71) Applicant: Isaac Wilcox, Berkeley, CA (US)

(72) Inventor: Isaac Wilcox, Berkeley, CA (US)

( * ) Notice: Subject to any disclaimer, the term of this patent is extended or adjusted under 35 U.S.C. 154(b) by 0 days.

(21) Appl. No.: 18/600,672

(22) Filed: Mar. 9, 2024

(65) Prior Publication Data
US 2024/0206410 A1    Jun. 27, 2024

Related U.S. Application Data

(63) Continuation-in-part of application No. 17/562,910, filed on Dec. 27, 2021, now abandoned, which is a continuation-in-part of application No. 16/252,549, filed on Jan. 18, 2019, now Pat. No. 11,206,773.

(60) Provisional application No. 62/709,397, filed on Jan. 18, 2018.

(51) Int. Cl.
*A01G 31/02* (2006.01)
*A01G 31/00* (2018.01)

(52) U.S. Cl.
CPC ........ *A01G 31/02* (2013.01); *A01G 2031/006* (2013.01)

(58) Field of Classification Search
CPC .......... A01G 31/06; A01G 9/022; A01G 9/02; A01G 9/023; A01G 9/027; A01G 31/00; A01G 31/02; A01G 31/16; A01G 2031/006; A01C 1/04
USPC ...................... 47/62 R, 62 A, 62 C, 62 E, 61
See application file for complete search history.

(56) References Cited

U.S. PATENT DOCUMENTS

| | | | | |
|---|---|---|---|---|
| 3,579,907 A | * | 5/1971 | Graves | A01G 31/02 47/79 |
| 4,149,970 A | * | 4/1979 | Atkins | A01C 21/00 47/62 N |
| 4,218,847 A | * | 8/1980 | Leroux | A01G 31/06 47/62 C |
| 4,332,105 A | * | 6/1982 | Nir | A01G 31/02 239/69 |
| 4,493,163 A | * | 1/1985 | de Monbrison | A01G 31/06 47/61 |
| 4,514,930 A | * | 5/1985 | Schorr | A01G 31/02 47/60 |
| 5,136,804 A | * | 8/1992 | Rothem | B05B 17/0615 47/60 |

(Continued)

*Primary Examiner* — Brady W Frazier
*Assistant Examiner* — Zoe Tam Tran
(74) *Attorney, Agent, or Firm* — My Patent Guys; Christopher Pilling

(57) ABSTRACT

The present invention includes a modular aeroponic garden system for growing plants. Through circulating an atomized fluid, nutrients and air through a conduit circuit the modular aeroponic garden system provides a closed-loop aeroponic system for growing plants. The closed-loop configuration allows the user to better control the internal environmental conditions of the modular aeroponic garden system, therein facilitating improved plant growth. Modular sections of conduit and modular joints allow the user to customize the aeroponic garden system to unique spaces and grow a variable quantity of plants. In doing so, the closed-loop system reduces time spent on maintenance, cleaning and monitoring of the plants grown within the modular aeroponic garden system and the system itself while better conserving resources such as water, electricity, and nutrients than comparable open-loop systems. In addition, novel open systems are provided, wherein fog generation devices are placed within the garden system.

7 Claims, 25 Drawing Sheets

(56) References Cited

U.S. PATENT DOCUMENTS

| | | | | |
|---|---|---|---|---|
| 5,161,327 A * | 11/1992 | Campbell | A47G 7/00 | |
| | | | 47/82 | |
| 5,394,647 A * | 3/1995 | Blackford, Jr. | A01G 31/02 | |
| | | | 47/62 A | |
| 5,875,802 A * | 3/1999 | Favaro | A47L 15/483 | |
| | | | 34/235 | |
| 6,219,966 B1 * | 4/2001 | Lapointe | A01G 31/02 | |
| | | | 47/62 C | |
| 8,468,741 B2 * | 6/2013 | Lewis | A01G 9/1423 | |
| | | | 47/17 | |
| 9,497,907 B2 * | 11/2016 | Anderson | A01G 31/02 | |
| 2011/0023359 A1 * | 2/2011 | Raring | A01G 31/02 | |
| | | | 47/62 A | |
| 2011/0061296 A1 * | 3/2011 | Simmons | A01G 31/02 | |
| | | | 47/62 A | |
| 2011/0061297 A1 * | 3/2011 | Simmons | A01G 31/02 | |
| | | | 47/62 A | |
| 2011/0067301 A1 * | 3/2011 | DeMitchell | A01G 31/02 | |
| | | | 251/356 | |
| 2015/0135593 A1 * | 5/2015 | Ross | A01G 31/02 | |
| | | | 47/62 R | |
| 2015/0264874 A1 * | 9/2015 | Zilkha | A01G 31/02 | |
| | | | 239/302 | |
| 2015/0313104 A1 * | 11/2015 | Cottrell | A01G 22/00 | |
| | | | 47/62 A | |
| 2016/0128288 A1 * | 5/2016 | Pettinelli | A01G 31/02 | |
| | | | 47/62 N | |
| 2016/0316645 A1 * | 11/2016 | Neufeld | A01G 31/02 | |
| 2017/0099791 A1 * | 4/2017 | Joseph | A01G 22/25 | |
| 2020/0163295 A1 * | 5/2020 | Mata | A01G 27/005 | |
| 2020/0288655 A1 * | 9/2020 | Iwanaga | B01J 21/06 | |
| 2022/0232786 A1 * | 7/2022 | Noble | A01G 31/02 | |

* cited by examiner

MODULAR AEROPONIC GARDEN SYSTEM

RELATED APPLICATIONS

The present application is a continuation in part application to U.S. patent application Ser. No. 17/562,910, filed on Dec. 27, 2022, which is a continuation in part application to to U.S. patent application Ser. No. 16/252,549, filed on Jan. 18, 2019, the disclosure of which is hereby incorporated in its entirety at least by reference.

BACKGROUND

1. Field of the Invention

The present invention relates to a modular aeroponic garden system for growing plants.

2. Description of Related Art

Traditional aeroponic, fogponic or hydroponic systems allow for plants to grow without the use of soil as a rooting medium. Traditional aeroponic systems allow for a refined control of nutrient, chemical and water distribution within a rooting environment. Additionally, traditional fogponic and aeroponic systems allow the grower relative control of temperature and humidity within the plant rooting environment by conditioning and regulating the mist or an atomized solution within the growth chamber. In aeroponic systems, the small droplet size of the atomized solution provides an ideal mechanism to deliver and transport moisture and necessary nutrients to plants without limiting oxygen uptake to the plant roots. Regulating the growth environment in fogponic systems is commonly accomplished with the use of ultrasonic transducers, fans and various mechanisms to condition the temperature of the solution.

Fogponic systems are often configured in an open-loop configuration, resulting in a loss of fog density and environmental stability as the internal environment of the system is exposed to the variable temperature and humidity of intake air. This open-loop style is limited in that environmental conditions within the aeroponic or fogponic system cannot be accurately controlled. Furthermore, because open-loop systems are exposed to uncontrolled environmental conditions the open-loop style leads directly to unnecessary labor, additional cleaning within the system and wasting of resources such as electricity, water and nutrients to maintain optimal conditions for plant growth. Another common fogponic method involves growing plants in a single enclosed reservoir that doubles as a plant growth chamber.

One drawback to using this fogponic method is the limited canopy space that results from growing plants in a confined growth chamber. Limited canopy space limits the number of plants that can be grown in a system as well as the biomass surface area that plants have to aid in essential growing steps, such as evapotranspiration, photosynthesis and nutrient uptake.

Additionally, often aeroponic systems are carried out by direct spraying nozzles. Direct spraying nozzle systems generate larger droplets than fogponic systems that do not suspend for an extended period of time through a rooting environment, thereby creating the need for more sprayers to feed a plurality of plants. Secondly, direct spraying nozzles require a pressurized system, wherein maintenance is often costly and timely.

SUMMARY

The present invention solves the problems described above by providing a modular aeroponic garden system for growing plants. Through circulating atomized nutrient solution through a conduit circuit the modular aeroponic garden system provides a closed-loop aeroponic system for growing plants. The closed-loop configuration allows the user to better control the internal environmental conditions of the modular aeroponic garden system. In doing so, this greatly reduces time spent on maintenance, cleaning and monitoring of the plants grown within the modular aeroponic garden system and can facilitate accelerated plant growth. The present invention provides a more efficient use of resources such as water, nutrients and electricity than comparable open-loop systems.

Another object of the invention is to provide the user easy assembly, cleaning and maintenance by providing a modular system that requires fewer parts than a nozzle aeroponic system of comparable size. The modular aeroponic garden system allows for customization by the user to match a desired quantity of plants to be grown or to fit within the allotted space the user has available. The modular aeroponic system allows for easy transportation, dis-assembly and customization by the grower.

In order to do so, a modular aeroponic garden system is provided, essentially comprising of at least one conduit having a first conduit opening and a second conduit opening. The first conduit opening, and the second conduit opening are in a sealed connection with one or more reservoirs and together form a closed-loop circulation flow for aeroponic gardening. Each reservoir of the one or more reservoirs is configured to store a volume of fluid. A plurality of plant support insert holes are positioned on at least one conduit, each of the plurality of insert holes are configured to receive a plant receptacle containing a plant with its roots of a plant within the conduit. Next, one or more fog generation devices are positioned in the one or more reservoirs, the one or more fog generation devices submerged in the volume of fluid and are configured to atomize fluid to be circulated by one or more fog distribution devices throughout the conduit. Finally, a hardware control assembly is communicatively coupled to one or more fog generation and distribution devices, wherein the hardware control assembly regulates atomization and circulation of the volume of fluid stored in the reservoir.

BRIEF DESCRIPTION OF THE FIGURES

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION OF CERTAIN EMBODIMENTS

While preferred embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure.

Unless otherwise defined, all technical terms used herein have the same meaning as commonly understood by one of ordinary skill in the art to which this disclosure belongs.

As used herein, the singular forms "a," "an," and "the" include plural references unless the context clearly dictates otherwise. Any reference to "or" herein is intended to encompass "and/or" unless otherwise stated.

Figure 1:
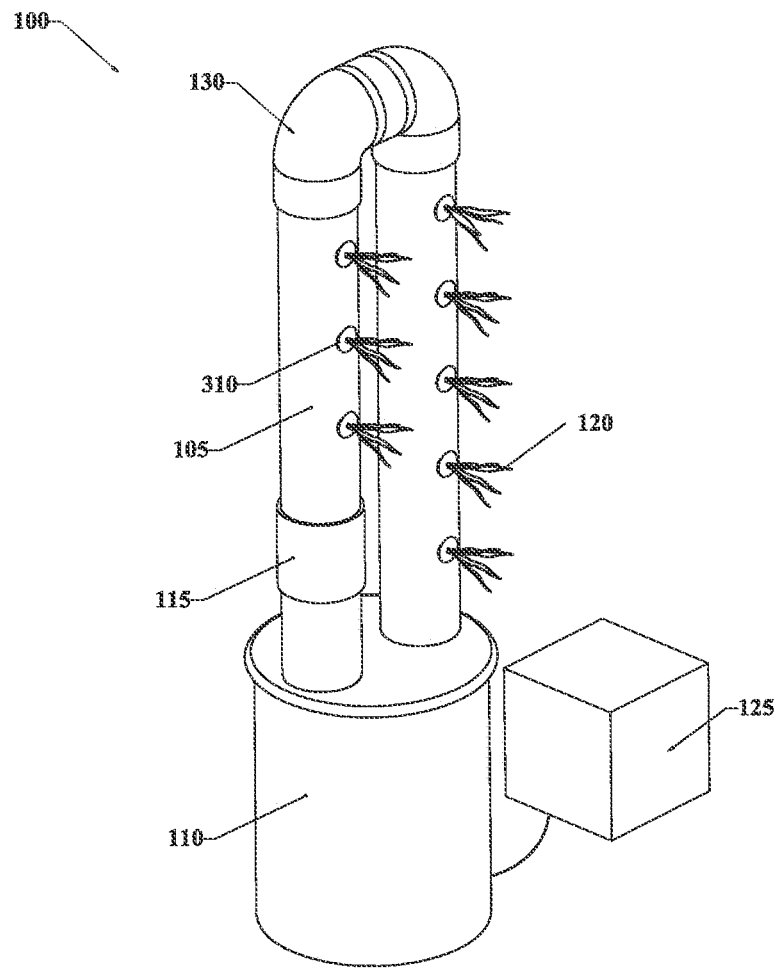
FIG. 1 shows an exemplary isometric view of one embodiment of the modular aeroponic garden system.
Figure 2:
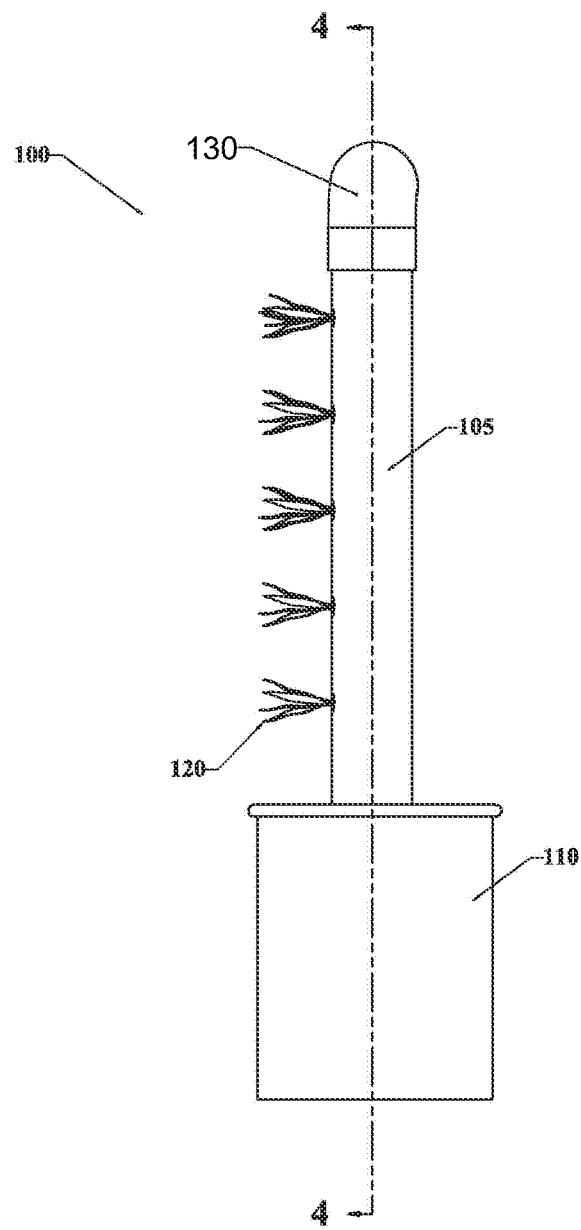
FIG. 2 shows an exemplary right view of one embodiment of the modular aeroponic garden system.

FIGS. 1-2 show exemplary isometric views of one embodiment of a modular aeroponic garden system 100. In the current exemplary embodiment, the aeroponic garden system comprises a reservoir 110 configured to store a volume of fluid. In some embodiments, the aeroponic garden system comprises one or more reservoirs. The aeroponic garden system comprises at least one conduit 105 having a first conduit opening and a second conduit opening, the first conduit opening and the second conduit opening in a sealed connection with the one or more reservoirs. As the volume of fluid leaves the reservoir as an atomized fluid and is circulated through the first conduit opening and the atomized fluid that is not absorbed by a plant 120, positioned along the conduit of the modular aeroponic garden system, is returned to the reservoir through the second conduit opening to the reservoir in either atomized or a condensed form. In some embodiments, at least one conduit is in a horizontal and/or vertical configuration In some embodiments, the conduit is sloped at an angle. Advantageously, the conduit comprises modular sections of conduit and modular joints 130, wherein the size, shape and alignment of the modular aeroponic garden system can be adapted by the user to be configured to match the space the user has available at the time of assembling the modular aeroponic garden system. The modular joints are adjoined to the modular sections of conduit to form a length of conduit starting at the first opening of the reservoir and ending at the second opening of the reservoir. In alternative embodiments, the conduit has the same cross-sectional shape as the modular joint and fits within the modular joint. A plurality of plant support insert holes 310 are provided in at least one conduit 105. The plurality of plant support insert holes are cut out of the conduit normal to the tangential plane of an outer surface of the conduit and are configured to receive a plant receptacle 305 (best seen in FIG. 10A-F) containing plant roots of a series of plants 120. A series of plants are inserted into the plurality of plant support insert holes along the conduit and are held in place by an attachment member 300 (best seen in FIG. 10). The reservoir, in some embodiments, is constructed of a rectangular shape, a square shape, an oval shape, and any shape known to one skilled in the art to retain water and have at least three sides.

Referring now to FIGS. 1-2 and 14-15, the modular aeroponic garden system, in some embodiments, comprises a system control assembly 125 configured to monitor and control a hardware control assembly 150, surveillance equipment 202, and a plurality of environmental sensors 320, wherein the system control assembly is connected to a communication network 240. In some embodiments, the plurality of environment sensors includes at least one member of a sensor set including: a temperature sensor, a mass airflow sensor, a humidity sensor, a contact sensor, a pressure sensor, a water level sensor, a water contact sensor, a nutrient dispenser, a ph doser, water flow rate sensor, a light, a magnetic sensor, a gas detection sensor, an ultrasonic transducer, an inclinometer, a thermocouple, a position sensor, a photodiode, a PH sensor, TDS sensor and a thermistor. The surveillance equipment, in some embodiments, is used to monitor the growth status of the plant inserted into the modular aeroponic garden system externally. In other embodiments, the surveillance system can be used to monitor an internal environment 135 (FIG. 3B) of the modular aeroponic garden system. In some embodiments, the surveillance equipment is at least one member of a surveillance set consisting of: a camera, a video camera, a motion sensor, and an infrared camera.

Figure 3A:
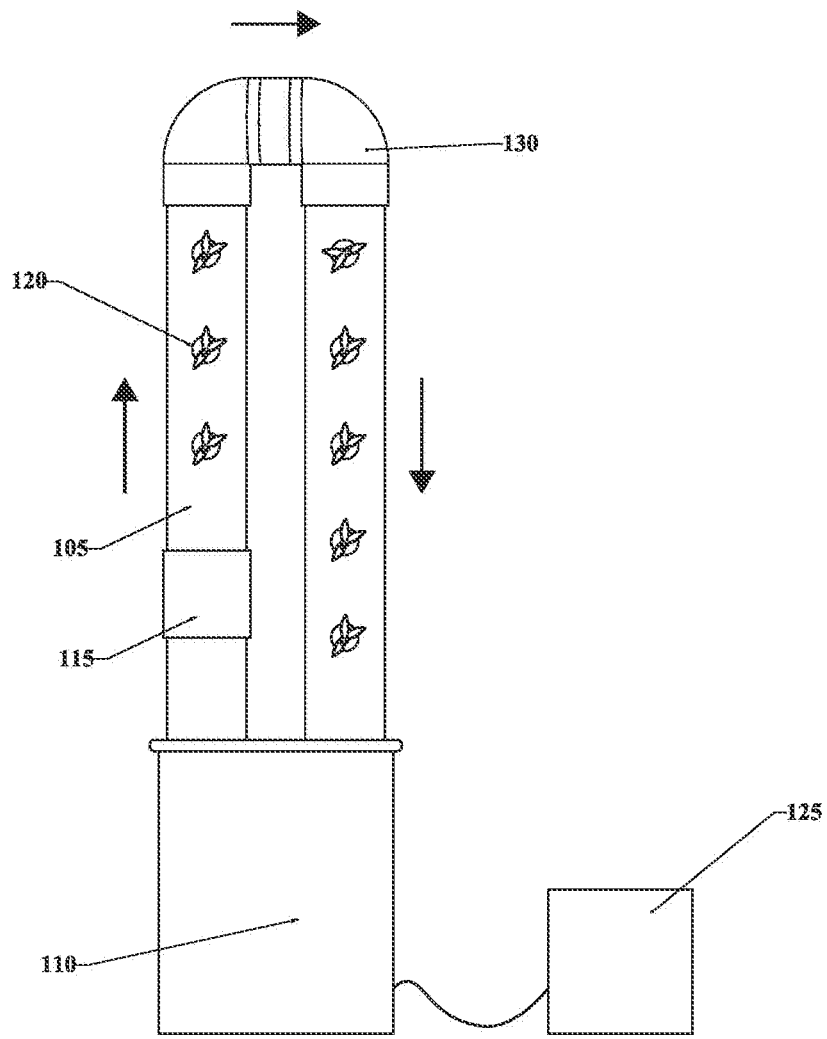
FIG. 3A shows an exemplary front view of one embodiment of the modular aeroponic garden system.
Figure 3B:
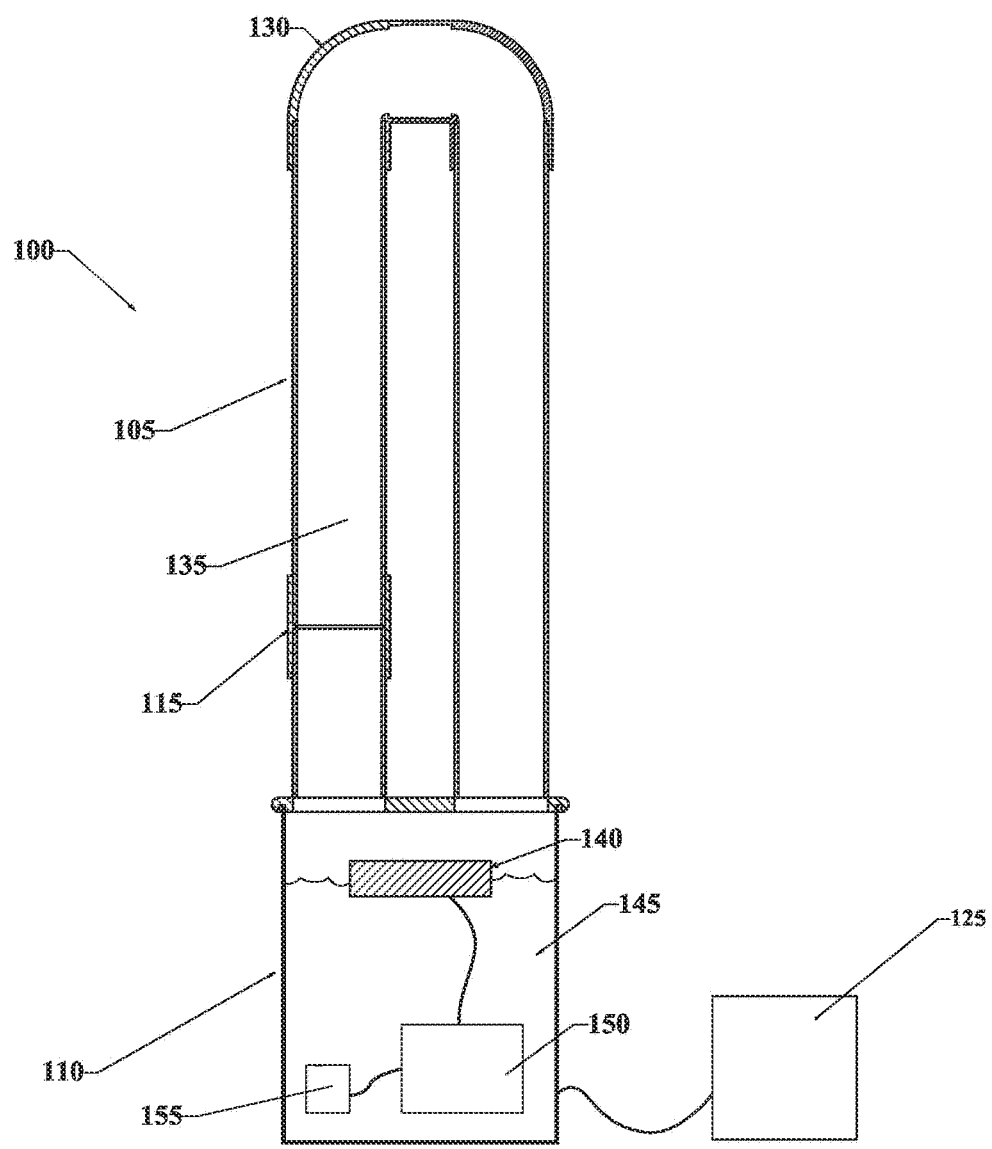
FIG. 3B shows an exemplary cross-sectional view of one embodiment of the modular aeroponic garden system, taken along line 4-4 in FIG. 2.
Figure 3C:
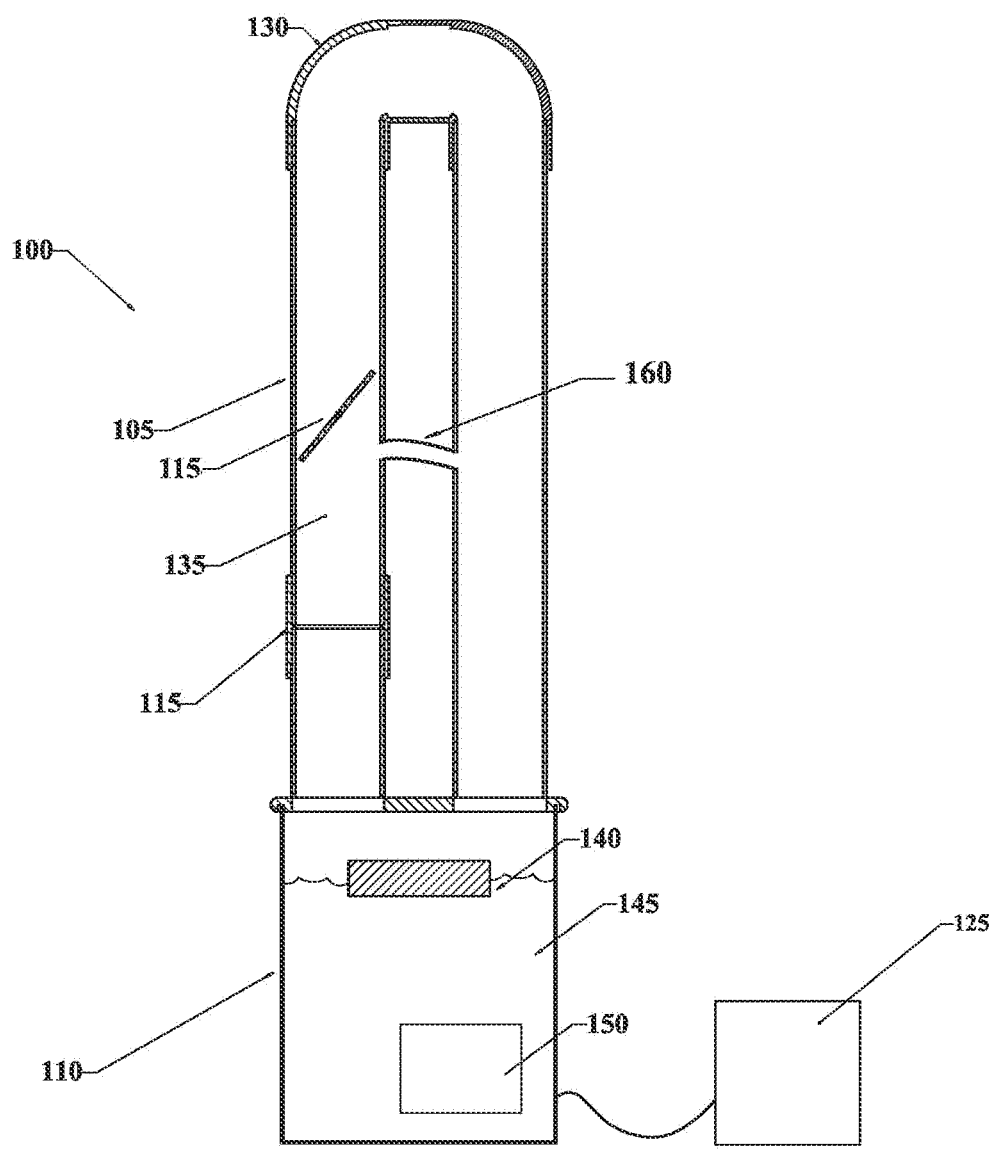
FIG. 3C shows an exemplary cross-sectional view of one embodiment of the modular aeroponic garden system, taken along line 4-4 in FIG. 2.

In reference to FIGS. 3A-3C, an exemplary front view of one embodiment of the modular aeroponic garden system is shown. The modular aeroponic garden system includes one or more fog generation devices 140 positioned in the one or more reservoirs. The fog generation devices, in some embodiments, rest upon the surface of the volume of fluid contained within the reservoir. In alternative embodiments, the fog generation devices are submerged just under the surface of the volume of fluid contained within the reservoir. The fog generation devices are selected from a group essentially consisting of: an air atomizing nozzle, a water chiller, an ultrasonic transducer, and a fog machine. As shown in FIG. 3C, in some embodiments an auxiliary conduit 160 is used to interconnect sections of conduit. The auxiliary conduit allows for atomized fluid to bypass directional circulation throughout the conduit if desired by the grower.

FIGS. 3B-3C show exemplary cross-sectional views of one embodiment of the modular aeroponic garden system, taken along line 4-4 in FIG. 2. The modular aeroponic garden system includes one or more fog distribution devices 115 configured to deliver the atomized fluid throughout at least one conduit to the plant roots. In some embodiments, the fog distribution device is at least one member of a fog distribution device set comprising: an air circulation device, a fan, an air pump, an air nozzle, flexible tubing, auxiliary conduit 160 and a damper. The fog distribution devices are used to regulate the airflow rate and airflow direction as the atomized fluid circulates throughout the modular aeroponic gardening system. In some embodiments, the fog distribution devices circulate atomized fluid throughout the conduit in a clockwise direction.

In some embodiments, the fog distribution devices circulate atomized fluid throughout the conduit in a counter-clockwise direction. The fog distribution devices can also deliver a nutrient solution within the volume of fluid that is in an atomized or a vaporized fluid state. In some embodiments, the modular aeroponic garden system further comprises an atomizing spray nozzle in addition to at least one member of the fog distribution device set. The atomizing spray nozzle can be used to direct an atomized solution through at least one member of the fog distribution device set. In doing so, the modular aeroponic garden system can more efficiently distribute the atomized solution throughout the internal environment of the conduit. The result is a well-maintained humidity level within the internal environment and improved fog stabilization throughout the internal environment of the modular aeroponic garden system.

In some embodiments, the modular aeroponic garden system further comprises a supplemental irrigation system 107, wherein the supplemental irrigation system delivers the volume of fluid to the plant inside the conduit. The supplemental irrigation system can also deliver a nutrient solution to plants within the aeroponic garden system. The supplemental irrigation system, in some embodiments, is connected to a pump 155 within the volume of fluid retained by the reservoir, wherein the pump is used to move the volume of fluid as well known in the art.

As shown, hardware control assembly 150, in the current exemplary embodiment, is within the reservoir. In alternative embodiments, the hardware control assembly may be positioned outside the reservoir. The hardware control assembly is configured to communicatively couple to the system control assembly and the communication network. The hardware control assembly controls at least one of a control set consisting of: amperage, voltage, polarity, and any digital aspect supplied by power supply 201 to at least one of the following: one or more fog generation devices, pump 155, a water level pump 170, the surveillance equipment, one or more fog distribution devices, a light, a heater, and an air conditioning unit. In some embodiments, power supply 201 is one member of a power supply set including: a direct current power supply, an alternating current power supply, a gasoline powered generator, a battery, a solar power supply, a natural gas power supply, and a wind-driven power supply. In some embodiments, the fan further comprises at least one motor of a motor set consisting of: a brushless motor, a brush motor, a DC motor, and an AC motor.

Figure 4:
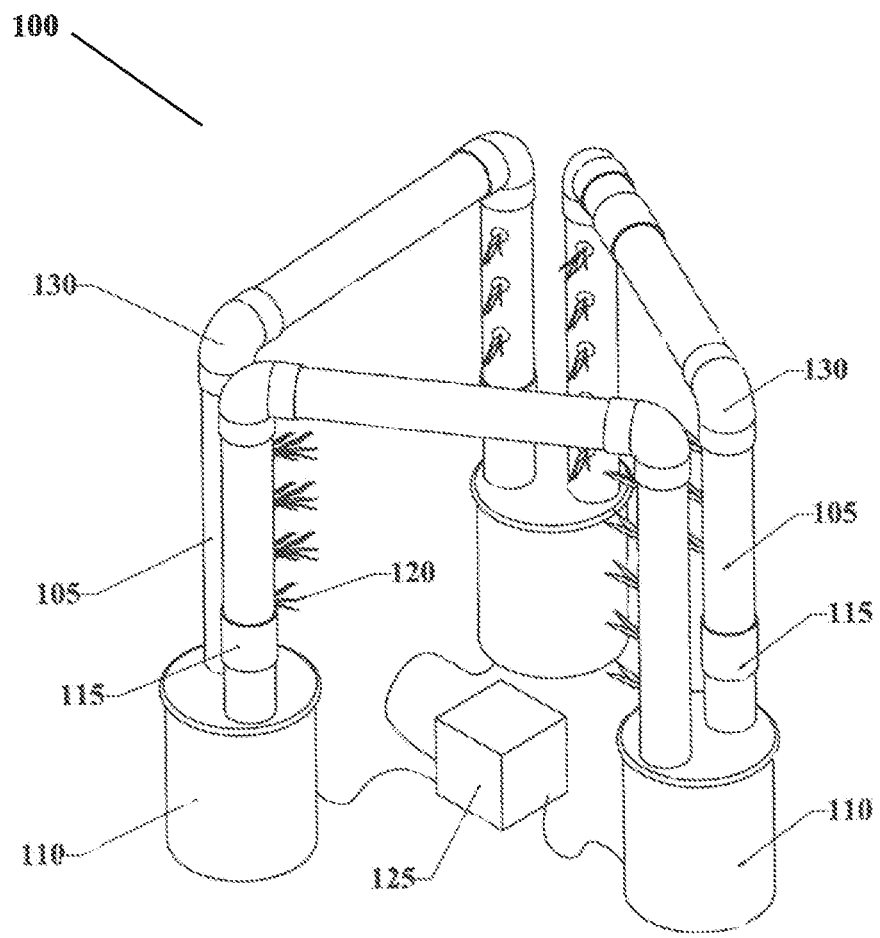
FIG. 4 shows an exemplary isometric view of one embodiment of the modular aeroponic garden system.
Figure 5:
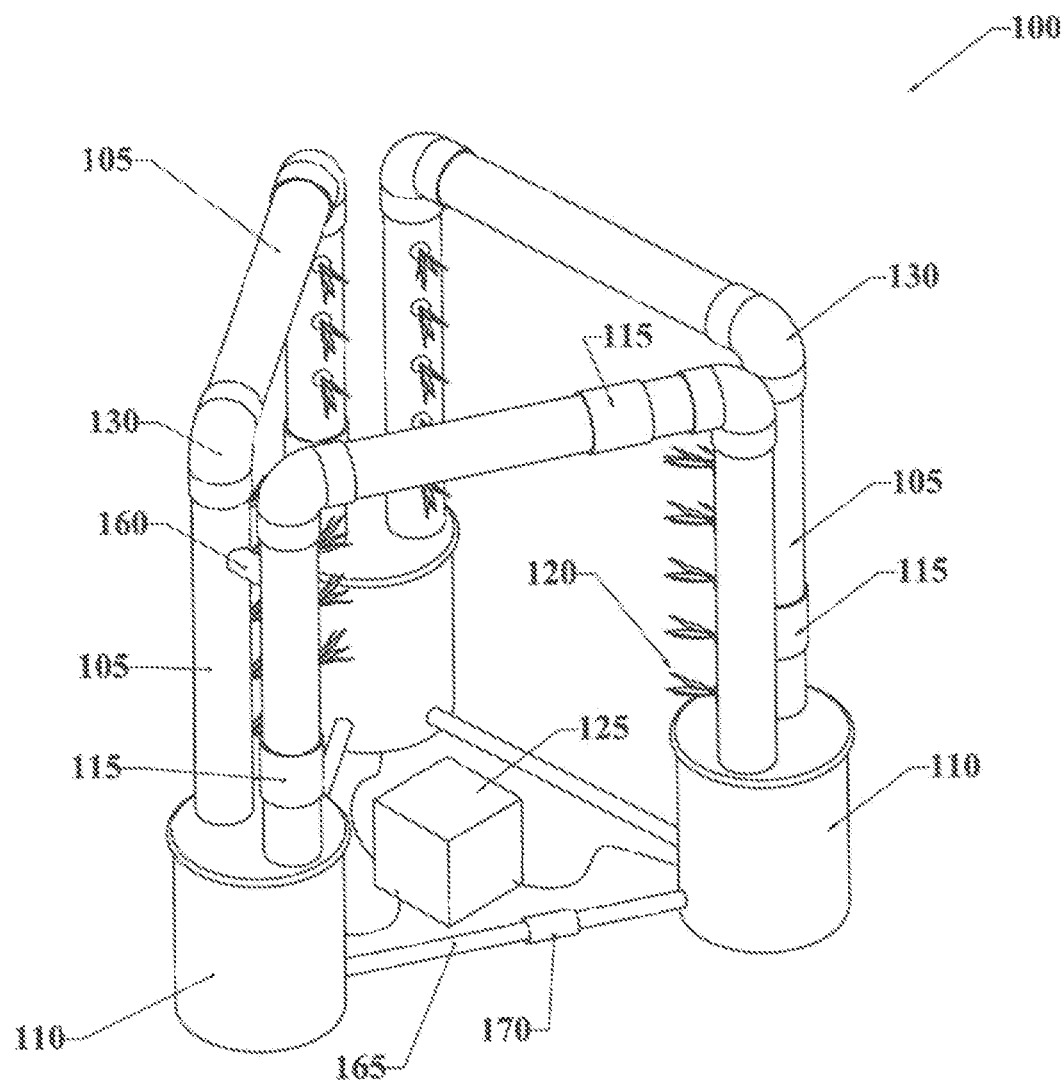
FIG. 5 shows an exemplary isometric view of one embodiment of the modular aeroponic garden system.

In reference to FIGS. 4-5, an exemplary isometric view of one embodiment of the modular aeroponic garden system is shown. In some embodiments, the modular aeroponic garden system comprises one or more conduits having a first conduit opening and a second conduit opening. In this embodiment, the volume of fluid stored in the reservoirs are circulated from a reservoir to the next reservoir by exiting the first conduit opening of a conduit and entering the second conduit opening of another conduit of another reservoir. In some embodiments, the auxiliary conduit is used to interconnect conduit sections and a water level conduit system is used to maintain equal water levels between multiple reservoirs. In some embodiments, the volume of fluid is returned to the original reservoir wherein the volume of fluid originated, therein completing a full circulation loop throughout the modular aeroponic garden system. In some embodiments, the volume of fluid is not returned to the original reservoir wherein the volume of fluid originated. In some embodiments, a water level conduit system 165 and the water level pump are used to regulate the water level evenly between multiple reservoirs of the same modular aeroponic garden system and to maintain homogeneity of temperature and nutrient mixture within the liquid solution.

Figure 6:
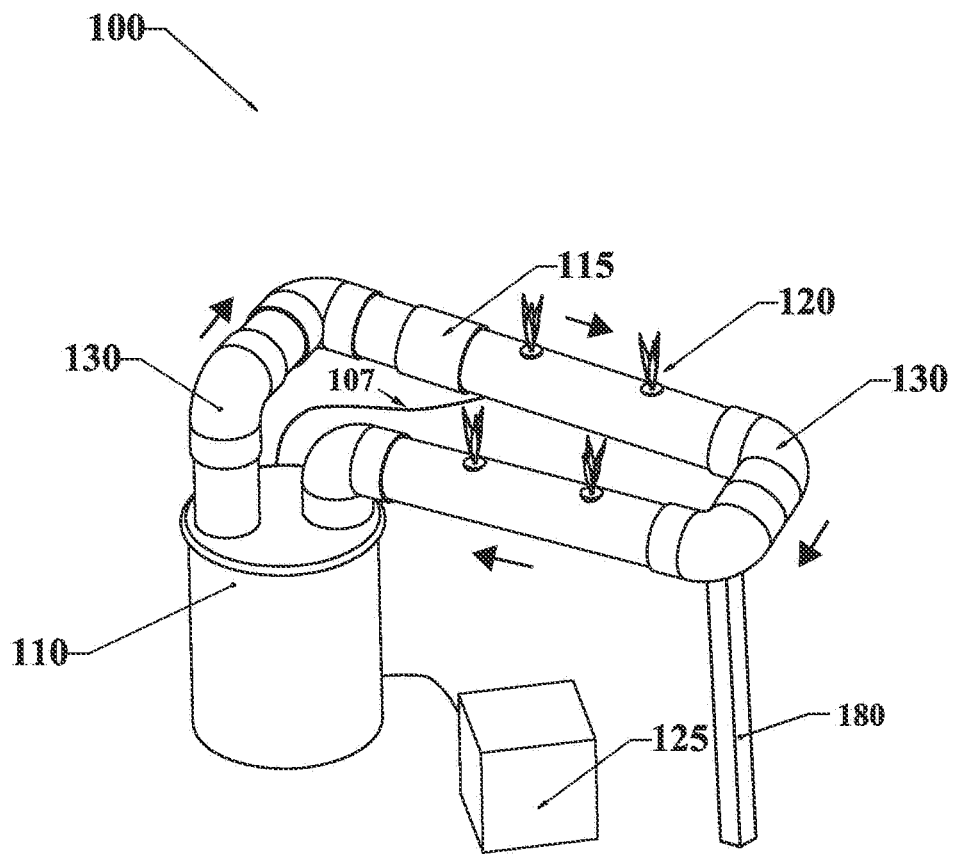
FIG. 6 shows an exemplary isometric view of one embodiment of the modular aeroponic garden system.
Figure 7:
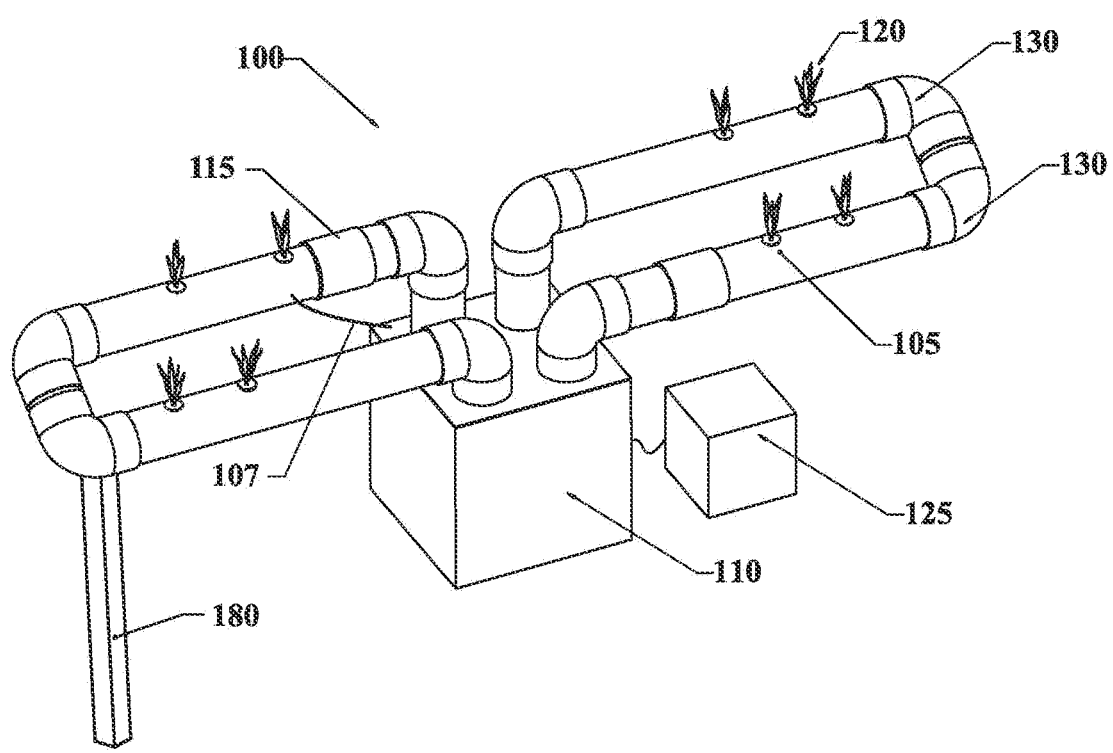
FIG. 7 shows an exemplary isometric view of one embodiment of the modular aeroponic garden system.
Figure 8:
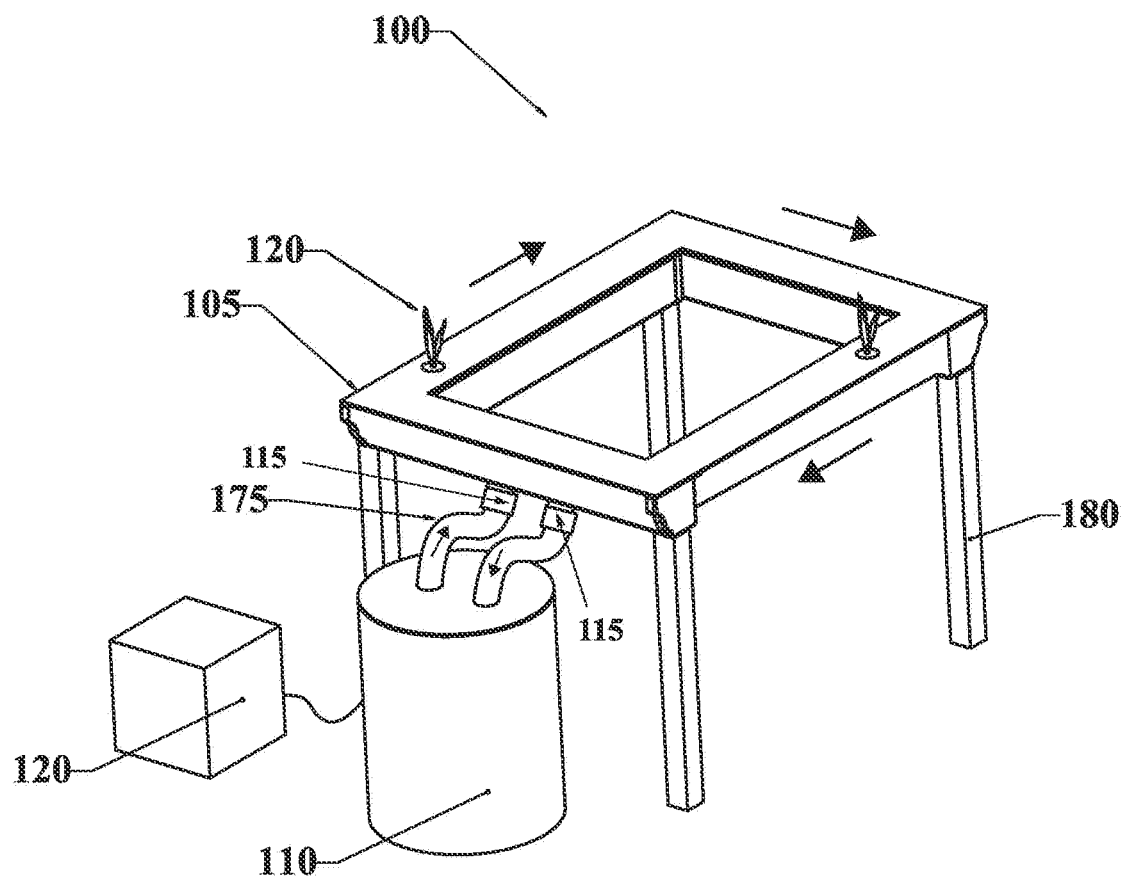
FIG. 8 shows an exemplary isometric view of one embodiment of the modular aeroponic garden system.

FIG. 6 shows an exemplary isometric view of one embodiment of the modular aeroponic garden system. In reference to FIG. 6, an exemplary horizontal configuration is shown. In this embodiment, the slope of the conduit sections can be at an angle. In some embodiments, the conduit sections of the modular aeroponic system are level. In reference to FIG. 7, multiple horizontal conduits are shown originating from the same reservoir. In some embodiments, when the conduit is horizontal, vertical or sloped a support member 180 can be placed by the grower to help offset the overhung weight of the conduit and the plants within the conduit, especially in embodiments having a supplemental nutrient film system. In some embodiments, the modular aeroponic garden system further comprises a trellis support (not shown) to aid in supporting plant matter as the plant grows.

In reference to FIGS. 8-10E, an exemplary configuration of the modular aeroponic garden system is shown having a rectangular configuration. In the embodiment shown in FIGS. 8-10E, the modular aeroponic garden system comprises an exemplary rectangular configuration wherein the modular aeroponic garden system is supported off the ground by support member 180. In this embodiment, at least one conduit 105 facilitates the closed-loop circulation of an atomized fluid through the rectangular conduit configuration exiting at the first conduit opening from the reservoir and ending at the second conduit opening, therefore returning to the reservoir. In some embodiments, the reservoir is connected to the conduit in a rectangular configuration by flexible tubing 175. In some embodiments, at least one of the fog distribution devices set is adjoined to the flexible tubing.

Figure 9:
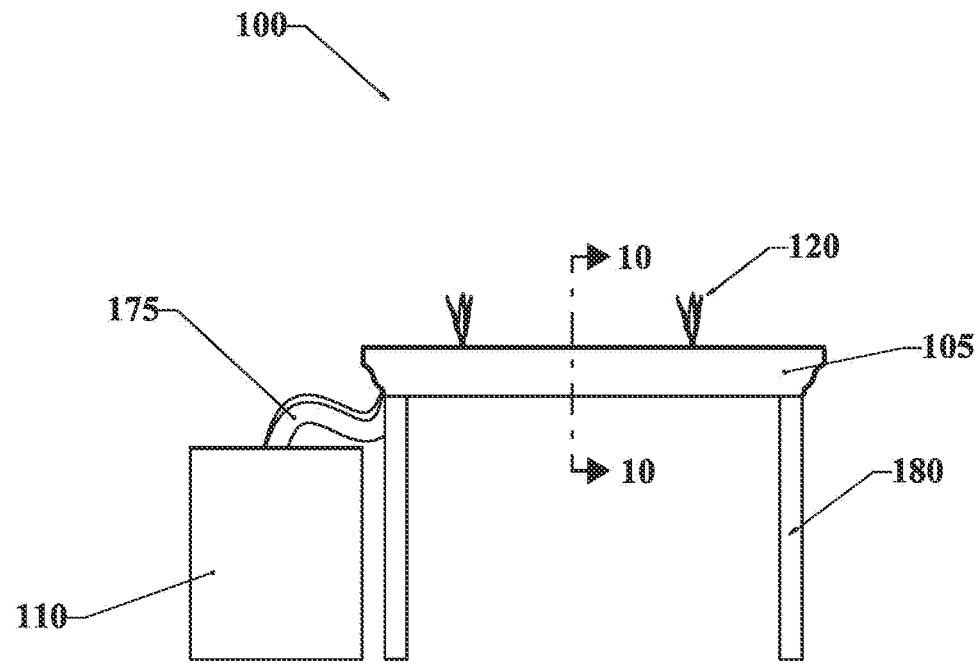
FIG. 9 shows an exemplary right view of one embodiment of the modular aeroponic garden system.
Figure 10A:
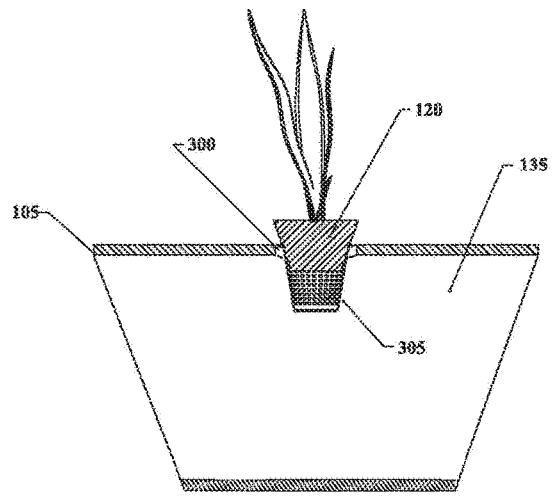
FIG. 10A-F shows exemplary cross-sectional views of the conduit of one embodiment of the modular aeroponic garden system, taken along line 10-10 in FIG. 9.
Figure 10B:
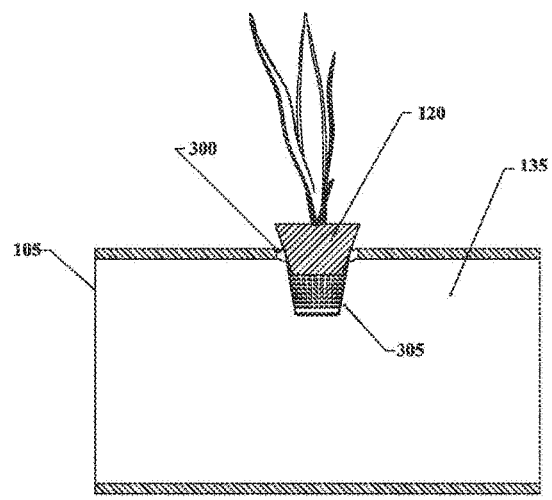
Figure 10C:
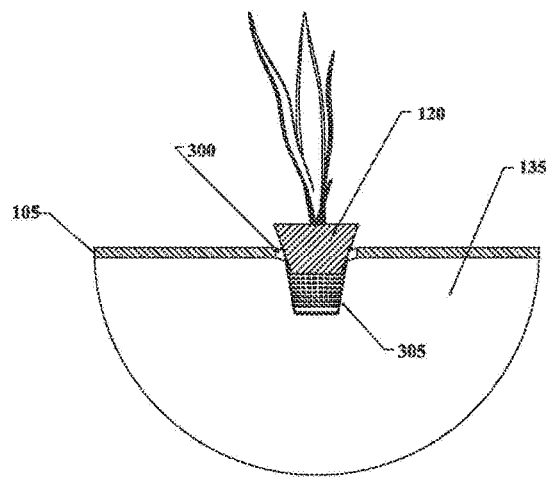
Figure 10D:
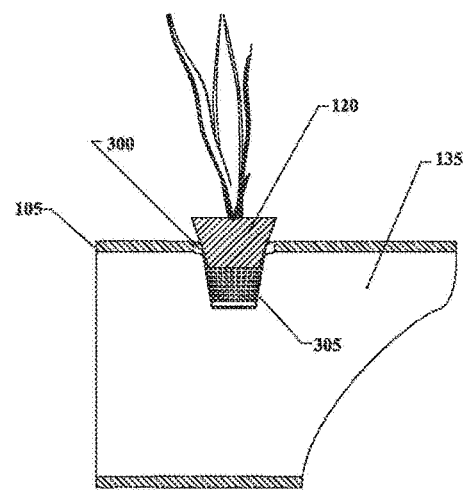
Figure 10E:
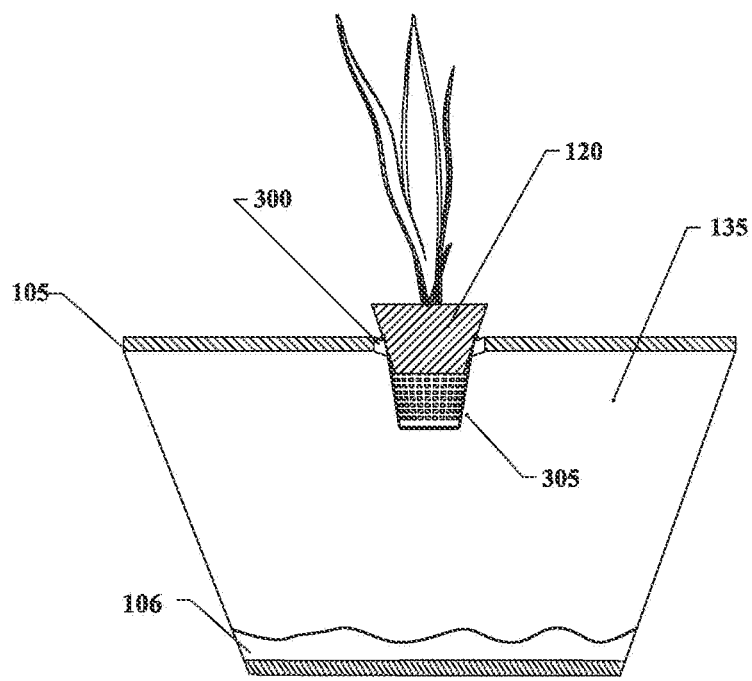
Figure 10F:
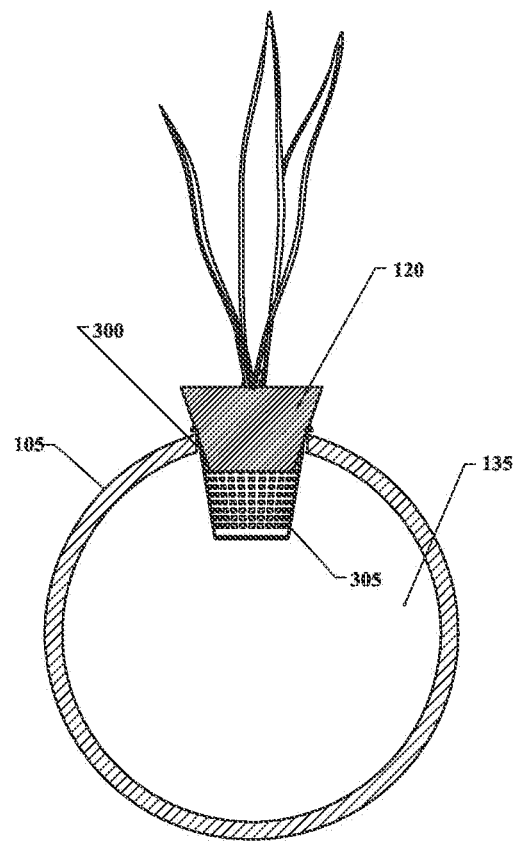
Figure 11:
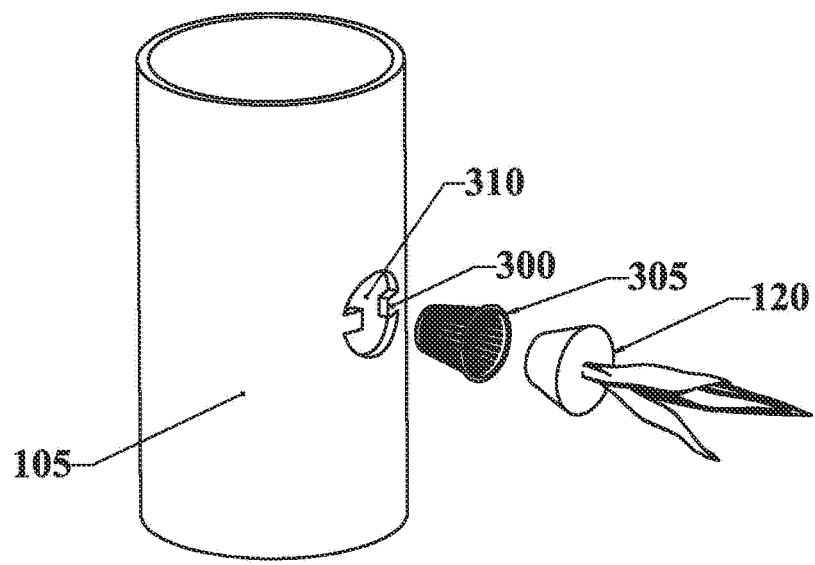
FIG. 11 shows an exemplary isometric view of the conduit of one embodiment of the modular aeroponic garden system.
Figures 12A, 12B:
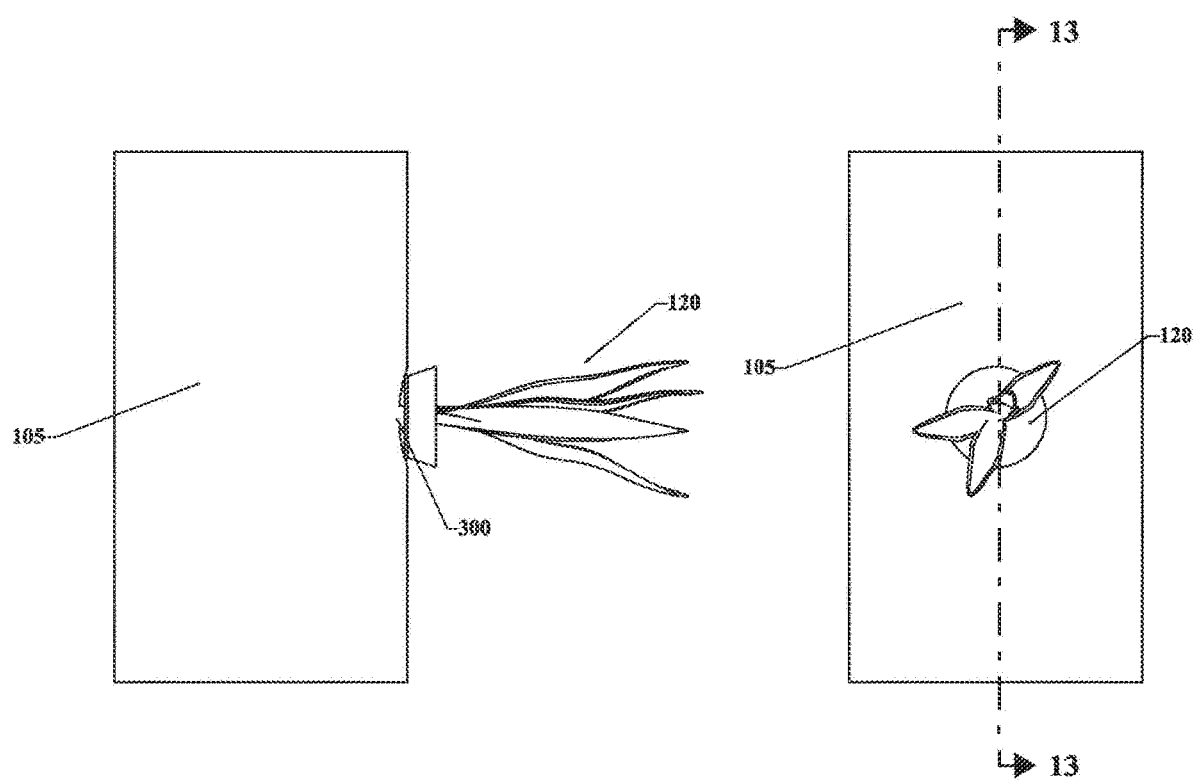
FIG. 12A shows an exemplary right view of the conduit of one embodiment of the modular aeroponic garden system.
FIG. 12B shows an exemplary right view of the conduit of one embodiment of the modular aeroponic garden system.
Figure 12C:
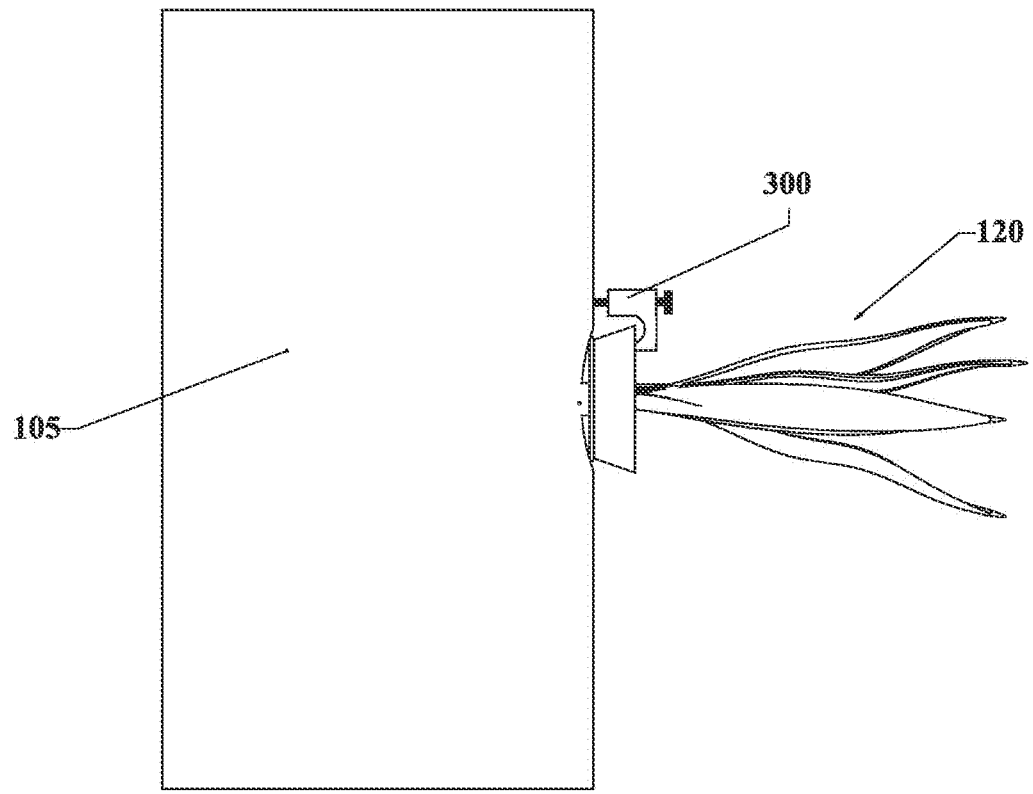
FIG. 12C shows an exemplary right view of the conduit of one embodiment of the modular aeroponic garden system.

FIGS. 10A-E show an exemplary cross-sectional view of one embodiment of the modular aeroponic garden system, taken along line 10-10 in FIG. 9. As shown in FIG. 10E, the modular aeroponic garden system can include a supplemental nutrient film system 106, wherein the supplemental nutrient film system uses gravity to deliver the volume of fluid to the plant inside the conduit. In an embodiment having the nutrient film system, the conduit is sloped to create a liquid stream to aid in the distribution of nutrients to all plants within or adjoined to the modular aeroponic garden system. The flow of liquid solution, in an embodiment having a nutrient film system, is first pumped out of the reservoir via pump 155 into the first opening in the conduit or directly into any location of the conduit and returns the reservoir through the second opening of the conduit. In some embodiments, the atomized fluid or fluid solution can return to the reservoir through the first opening. The flow of liquid solution for the supplemental nutrient film system, in some embodiments, is first circulated through at least one member of the fog distribution devices. In a preferred embodiment, the liquid solution for the supplemental nutrient film system is passed through a water chiller to control the temperature of the liquid solution entering the conduit.

Figure 13A:
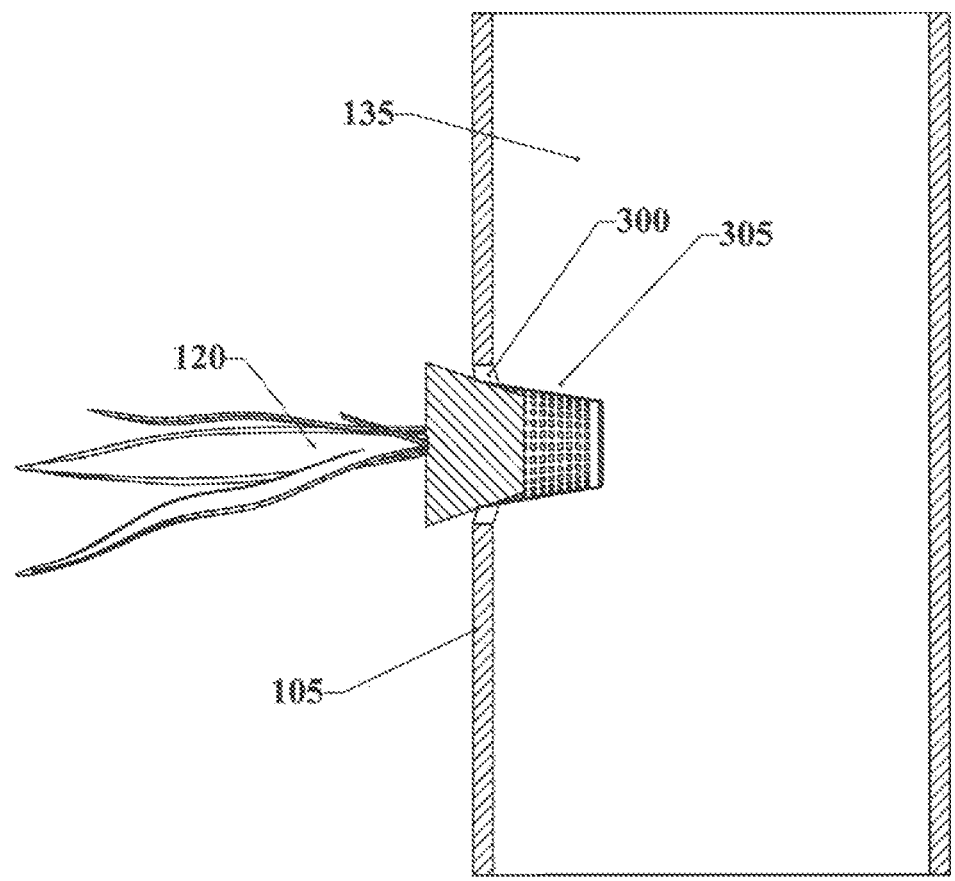
FIG. 13A-C shows an exemplary cross-sectional view of one embodiment of the modular aeroponic garden system, taken along line 13-13 in FIG. 12B.
Figure 13B:
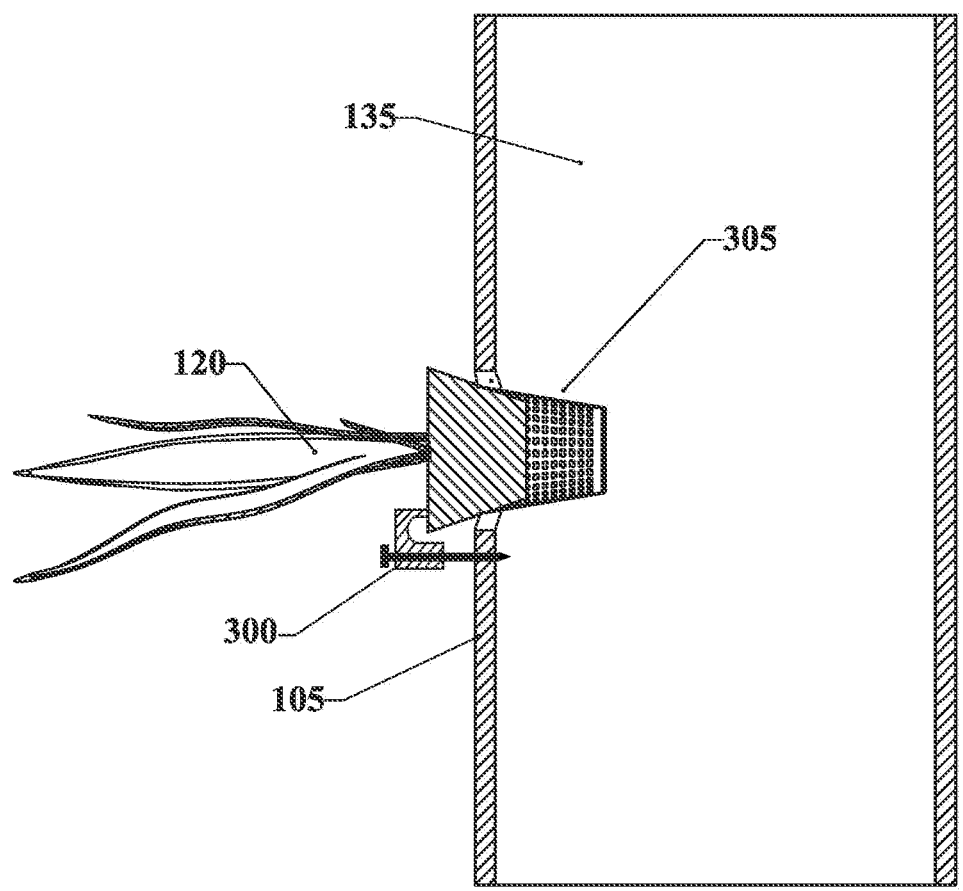
Figure 13C:
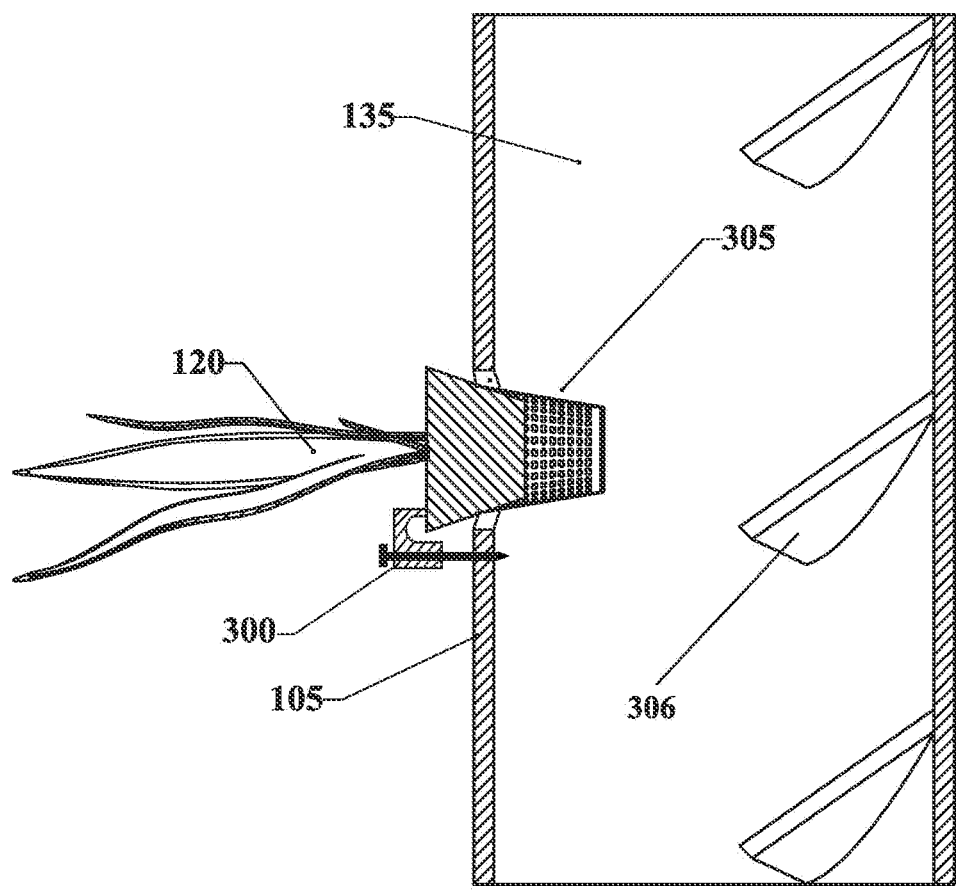

FIGS. 11, 12A-B and 13A-C show an exemplary isometric view of one embodiment of the modular aeroponic garden system. FIGS. 13A-B show an exemplary cross-sectional view of one embodiment of the modular aeroponic garden system, taken along line 13-13 in FIG. 12B. As shown, the plant 120 is held within a plurality of plant support insert holes 310 by at least one of the attachment members 300. In some embodiments, plant 120 is first placed within plant receptacle 305 before being aligned and inserted into a plurality of plant support insert holes. In some embodiments, the plant receptacle has a series of openings arranged on an outer surface of the plant receptacle. In some embodiments, the plant receptacle is made of a netting material. In some embodiments, the plant receptacle is made of a mesh material. In some embodiments, the attachment member is at least one member of an attachment set, by way of non-limiting example, consisting of: a nail clamp, a magnet, Velcro, a neoprene disc, an adhesive, tape, a rubber gasket, a screw, a fastener, a spring, a snap-fit member and a clamp. In some embodiments, the conduit can be adjoined to the reservoir by at least one member of the attachment set. In some embodiments, the conduit is not in a sealed connection with at least one reservoir. As shown in FIG. 13C, in some embodiments, the conduit further comprises internal ribs 306 to steer and alter the circulation of air and atomized fluid inside the conduit. The internal ribs 306 create an internal vortex or twisting of the air and atomized fluid within the conduit, improving uniformity, speed of distribution and even distribution of the atomized fluid throughout the modular aeroponic garden system. In some embodiments, the internal ribs 306 are a continuous corkscrew shape spiraling down the length of conduit, therein directing the atomized fluid and air in a spiral pattern.

Figure 14:
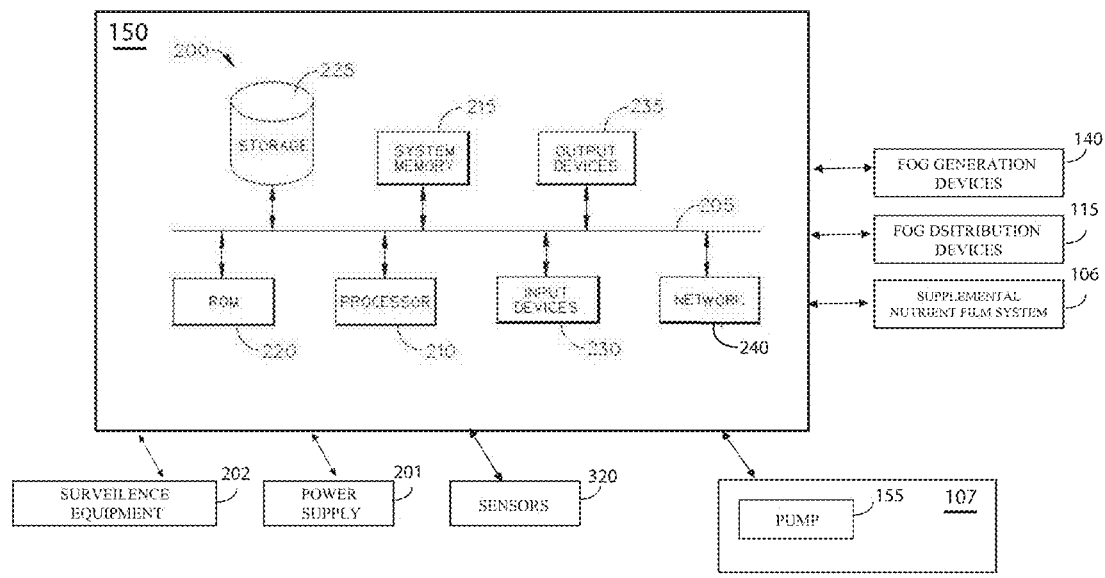
FIG. 14 shows an exemplary diagram view of the hardware control assembly of one embodiment of the modular aeroponic garden system.
Figure 15:
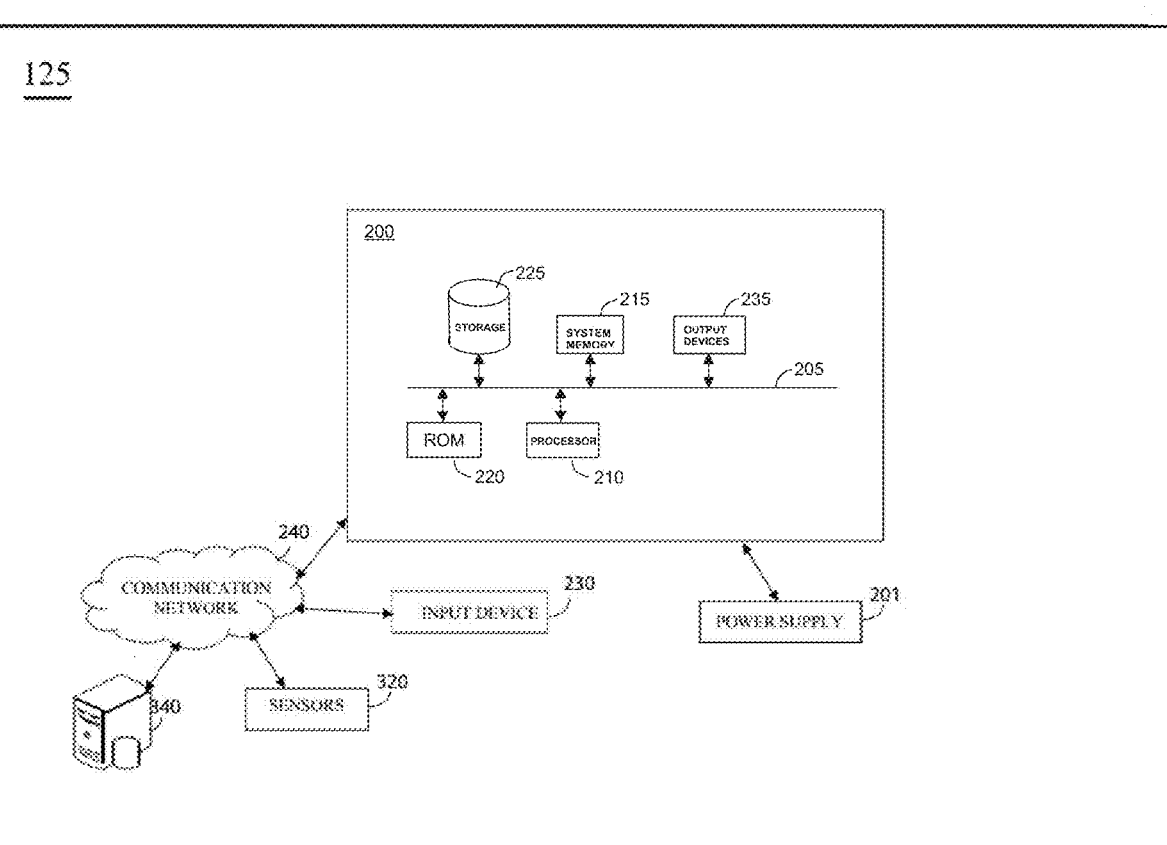
FIG. 15 shows an exemplary diagram view of the system control assembly of one embodiment of the modular aeroponic garden system.

FIGS. 14-15 conceptually illustrate an electronic system 200 with which some embodiments of the invention are implemented. The electronic system of the hardware control assembly or the system control assembly may be a computer, phone, PDA, or any other sort of electronic device. Such an electronic system includes various types of computer readable media and interfaces for various other types of computer readable media. Electronic system 200 includes a bus 205, processing unit(s) 210, a system memory 215, a read-only 220, a permanent storage device 225, input devices 230, output devices 235, and a communication network 240.

Bus 205 collectively represents all system, peripheral, and chipset buses that communicatively connect the numerous internal devices of the electronic system. For instance, the bus communicatively connects the processing unit(s) 210 with the read- only, the system memory, and the permanent storage device.

From these various memory units, the processing unit(s) retrieves instructions to execute and data to process in order to execute the processes of the invention. The processing unit(s) may be a single processor or a multi-core processor in different embodiments.

Read-only-memory (ROM) 220 stores static data and instructions that are needed by the processing unit(s) and other modules of the electronic system. The permanent storage device on the other hand, is a read-and-write memory device. This device is a non-volatile memory unit that stores instructions and data even when the electronic system is off. Some embodiments of the invention use a mass-storage device (such as a magnetic or optical disk and its corresponding disk drive) as the permanent storage device. In some embodiments, permanent storage device 225 also comprises a remote computer system 340.

Other embodiments use a removable storage device (such as a floppy disk or a flash drive) as the permanent storage device 225. Like the permanent storage device, the system memory is a read-and-write memory device. However, unlike the permanent storage device, the system memory is a volatile read-and-write memory, such as a random access memory. The system memory stores some of the instructions and data that the processor needs at runtime. In some embodiments, the invention's processes are stored in the system memory, the permanent storage device, and/or the read-only. For example, the various memory units include instructions for processing appearance alterations of displayable characters in accordance with some embodiments. From these various memory units, the processing unit(s) retrieves instructions to execute and data to process in order to execute the processes of some embodiments.

The bus also connects to the input devices and the output devices. The input devices enable the person to communicate information and select commands to the electronic system. The input devices include alphanumeric keyboards and pointing devices (also called "cursor control devices"). The output devices display images generated by the electronic system. The output devices include printers and display devices, such as cathode ray tubes (CRT) or liquid crystal displays (LCD). Some embodiments include devices such as a touchscreen that functions as both input and output devices.

Finally, as shown in FIGS. 14-15, bus 205 also couples the electronic system to a communication network 240 through a network adapter (not shown). In this manner, the computer can be a part of a network of computers (such as a local area network ("LAN"), a wide area network ("WAN"), or an intranet, or a network of networks (such as the Internet). Any or all components of electronic system 200 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through the communication network.

In some embodiments, the system control assembly is configured to monitor and control the hardware control assembly, surveillance equipment 202, and the plurality of environmental sensor, wherein the system control assembly is also connected to the communication network. In some embodiments, input device 230 comprises a Wi-Fi device, a cellular device, a Bluetooth device, a satellite mobile communication device, a radio device, a LoRa device, a WLAN device, a microwave communication device, or any combination thereof. In some embodiments, the communication network comprises a Wi-Fi network, a cellular network, a Bluetooth connection, a satellite network, a radio network, a RF network, a LoRa network, a WLAN device, a microwave communication device, or any combination thereof. The communication network, in various cases, is the Internet and/or extranet, or an intranet and/or extranet that is in communication with the Internet. The communication network, in some cases, is a telecommunication and/or data network. Examples of remote computer systems 340 include personal computers (e.g., portable PC), slate or tablet PCs (e.g., Apple® iPad, Samsung® Galaxy Tab, etc.), smartphones (e.g., Apple® iPhone, Android-enabled device, Blackberry®, etc.), or personal digital assistants.

Figure 16A:
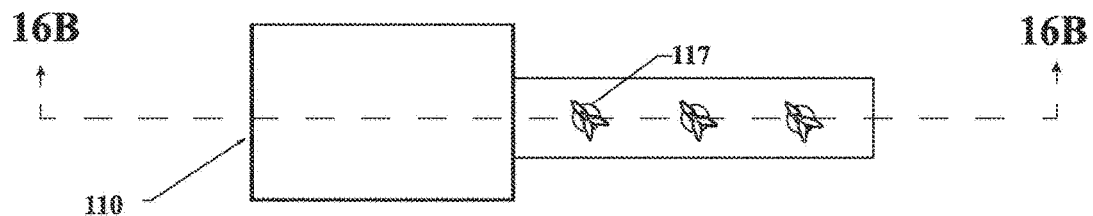
FIG. 16A shows an exemplary top view of an open modular aeroponic garden system according to one embodiment.
Figure 16B:
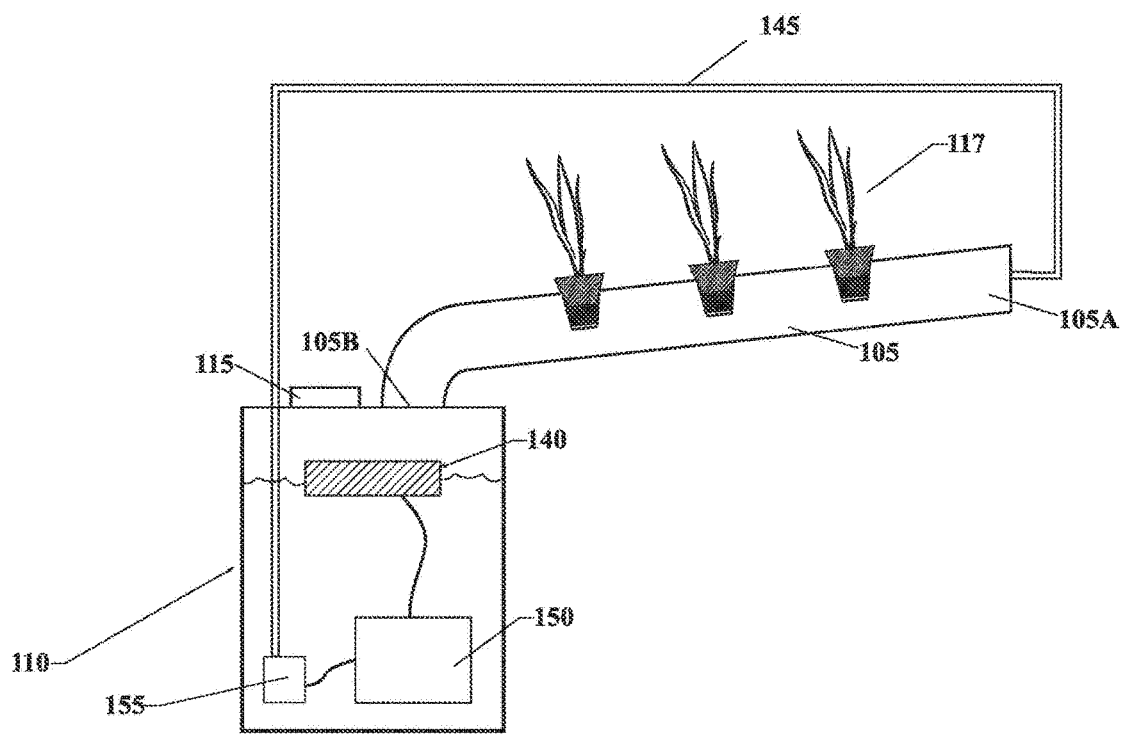
FIG. 16B shows an exemplary cross-sectional view of one embodiment of the modular aeroponic garden system, taken along line 16B-16B in FIG. 16A.

FIGS. 16A-B illustrate an open modular aeroponic garden system according to one embodiment of the present invention. Referring now to FIGS. 16A-B, in the current exemplary embodiment, the aeroponic garden system comprises a reservoir 110 configured to store a volume of fluid. In some embodiments, the aeroponic garden system comprises one or more reservoirs. The aeroponic garden system comprises at least one conduit 105 having a first conduit opening 105A and a second conduit opening 105B, the second conduit opening is in fluid connection with the one or more reservoirs, wherein the first conduit is open and not sealed with any other conduit. During use, a volume of fluid is delivered into the first conduit opening via a delivery conduit 145. In one embodiment, the delivery conduit is coupled with pump 155 within the reservoir to pump the volume of fluid through the delivery conduit 145. In some embodiments, the volume of water that is not absorbed by plants 117, positioned along the conduit of the modular aeroponic garden system, is returned to the reservoir through the second conduit opening to the reservoir. In some embodiments, the conduit is sloped at an angle, however vertical and horizontal conduits may be present. This delivery is intended to be continuous as an NFT (nutrient film technique) system.

Advantageously, the NFT system is coupled with a fogponics system. More specifically, the modular aeroponic garden system includes one or more fog generation devices 140 positioned in the one or more reservoirs 110. The fog generation devices, in some embodiments, rest upon the surface of the volume of fluid contained within the reservoir. In alternative embodiments, the fog generation devices are submerged just under the surface of the volume of fluid contained within the reservoir. As previously described herein, the fog generation devices produce an atomized fluid. In some embodiments, the atomized fluid is delivered to the plants 117 via the delivery conduit 145. In other embodiments, the atomized fluid is delivered to the plants directly through the second conduit opening 105B. As previously described, in some embodiments, a hardware control assembly 150 may be provided to control the system. In one embodiment, a fog distribution device or fan 115 is embedded in the reservoir 110, and distributes fog from the reservoir to the plant roots in conduit through lower conduit opening 105B.

Figure 17A:
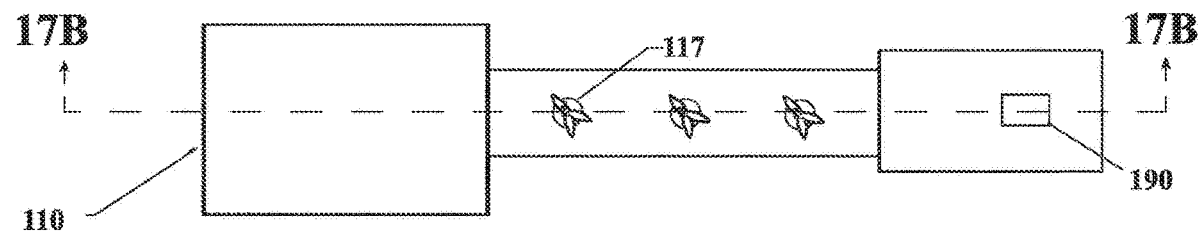
FIG. 17A shows an exemplary top view of an open modular aeroponic garden system according to one embodiment.
Figure 17B:
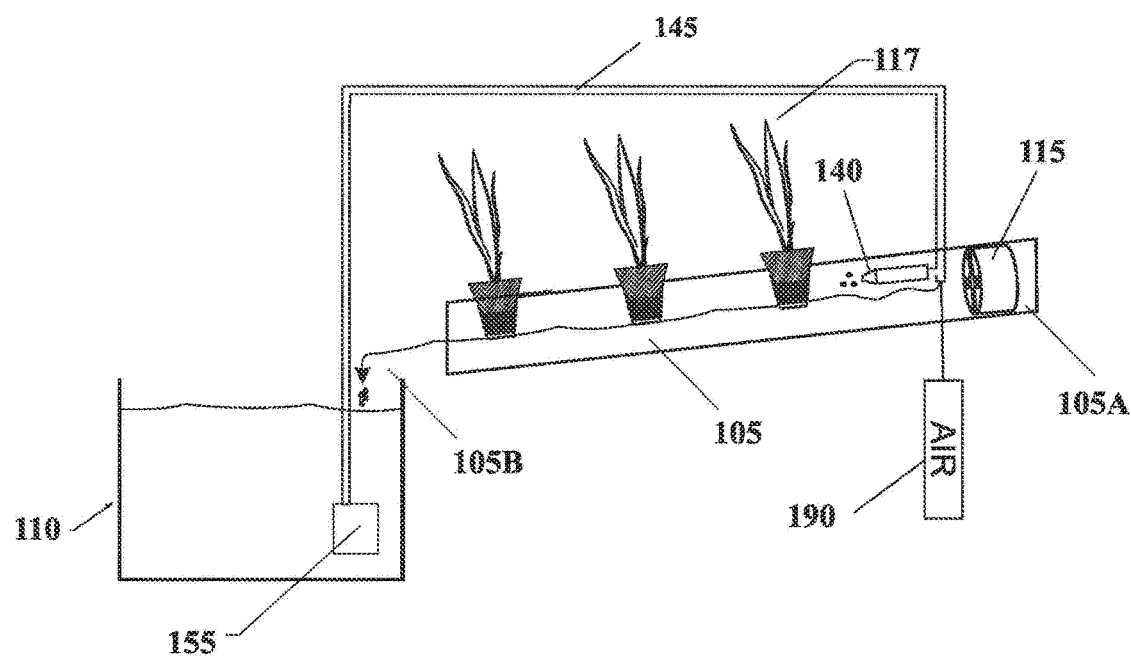
FIG. 17B shows an exemplary cross-sectional view of one embodiment of the modular aeroponic garden system, taken along line 17B-17B in FIG. 17A.

FIGS. 17A-B illustrate an open modular aeroponic garden system according to one embodiment of the present invention. Referring now to FIGS. 17A-B, in the current exemplary embodiment, the aeroponic garden system comprises a reservoir 110 configured to store a volume of fluid. In some embodiments, the aeroponic garden system comprises one or more reservoirs in fluid communication with each other. The aeroponic garden system comprises a sloped conduit 105 having a first conduit opening 105A and a second conduit opening 105B. In this embodiment, the first conduit and the second conduit are open and not sealed with any other conduit. The second conduit is positioned near the reservoir such that fluid can return to the reservoir via gravity after being delivered to the plants 117. In this embodiment, a fog generation device 140 is positioned within the conduit 105 configured to produce an atomized fluid as previously described. The fog generation device may be positioned anywhere along the sloped conduit 105. In this embodiment, the fog generation device is illustrated as a mister nozzle or ultrasonic transducer, wherein the fog generation device is coupled to compressed air 190 and the delivery conduit 145 providing the fluid necessary to operate the fog generation device, and is distributed to plants 117, by fan 115. The delivery conduit also provides a volume of fluid to the plants 117 via the delivery conduit 145 via pump 155. As illustrated, the delivery conduit 145 is split or forked at the end providing the fluid to both the fog generation device and the conduit 105. This solution effectively couples the NFT delivery with the fogponics delivery. Advantageously, this embodiment enables a fog generation device to be added to an existing NFT system. In some embodiments, a fog distribution device is provided, wherein the fog distribution device is at least one member of a fog distribution device set comprising: an air circulation device, a fan, an air pump, an air nozzle, flexible tubing, an auxiliary conduit, and a damper.

Figure 18:
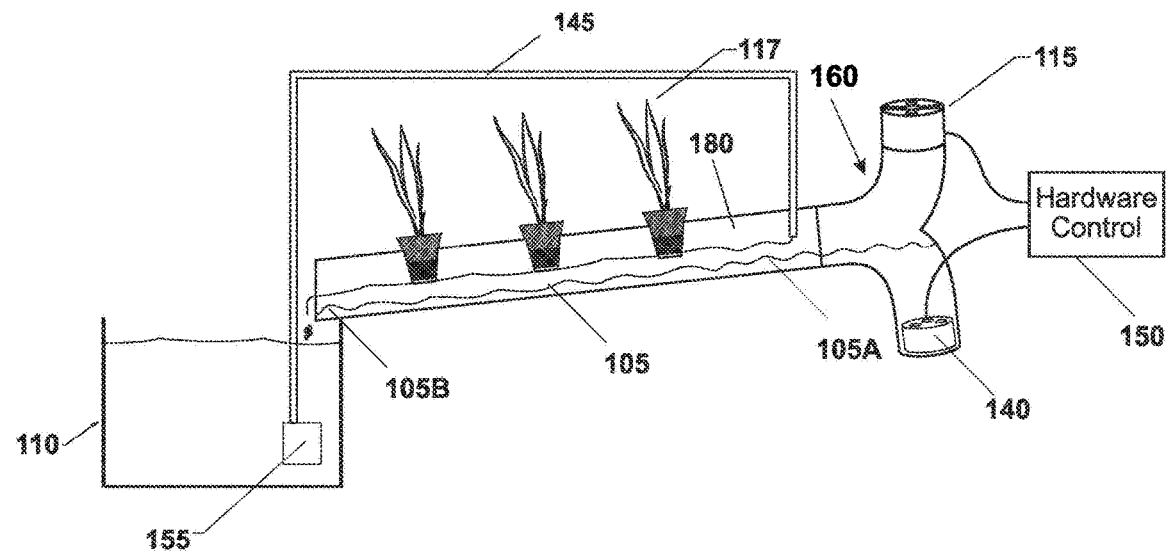
FIG. 18 shows an exemplary cross-sectional view of one embodiment of the modular aeroponic garden system.
Figure 19:
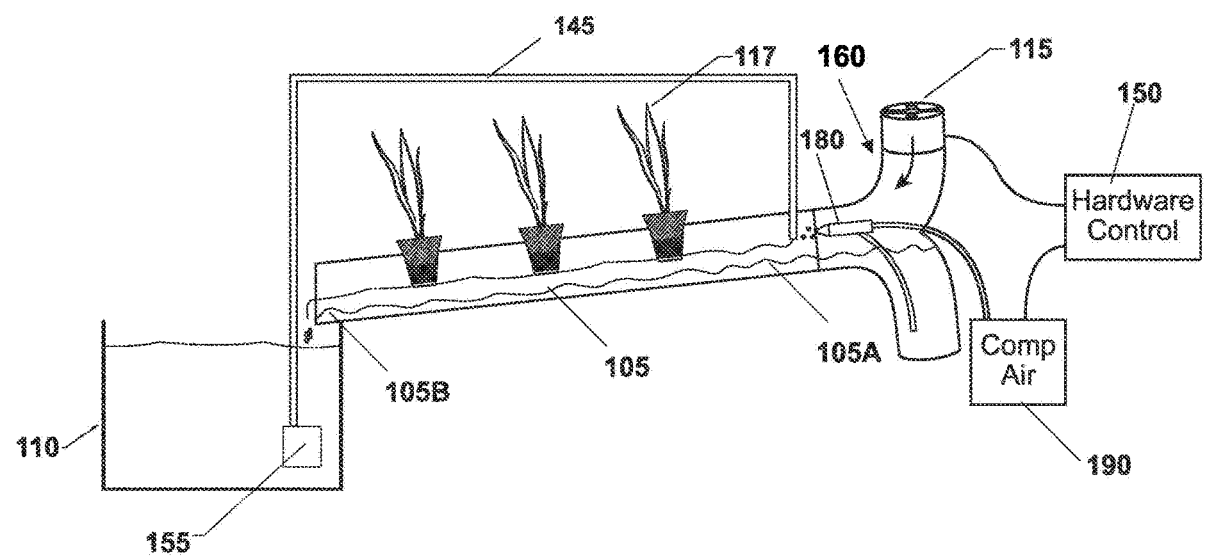
FIG. 19 shows an exemplary cross-sectional view of one embodiment of the modular aeroponic garden system.

FIGS. 18 and 19 illustrate two modular aeroponic garden systems according to some embodiment of the present invention. Referring now to FIGS. 18 and 19, the aeroponic garden system comprises a reservoir 110 configured to store a volume of fluid. In some embodiments, the aeroponic garden system comprises one or more reservoirs in fluid communication with each other. The aeroponic garden system comprises a sloped conduit 105 having a first conduit opening 105A and a second conduit opening 105B. In this embodiment, the first conduit is in sealed connection with an auxiliary conduit and the second conduit opening is not sealed with any other conduit. The second conduit opening is positioned near the reservoir such that fluid can return to the reservoir via gravity after being delivered to the plants 117. In one embodiment, as seen in FIG. 18, a fog generation device 140 is positioned within the auxiliary conduit 160 configured to produce an atomized fluid as previously described. The fog generation device may be positioned anywhere along the sloped conduit 105. In these embodiments, the fog generation device is illustrated as a venturi tube mister nozzle, wherein the fog generation device is coupled to compressed air and a hardware control or as an ultrasonic transducer. In both examples, the delivery conduit 145 provides the fluid necessary to operate the fog generation device. The delivery conduit can also provide a volume of fluid to the plants 117 via the delivery conduit 145 via pump 155. Advantageously, these embodiments enable a fog generation device to be added to an existing NFT system. In some embodiments, a fog distribution device 115 is provided as a fan, wherein the fan moves the air in the rooting environment as a means of evenly distributing fog to the plant roots to help facilitate consistent plant growth. As an example, illustrated in FIGS. 18 and 19 is a fan 115 positioned in an auxiliary conduit which is branched off approximate the first conduit opening 105A. In some embodiments, there are two auxiliary conduits branched approximate the first conduit opening 105A, an upper auxiliary conduit configured for a fog distribution device and a lower auxiliary conduit which is configured to hold fluid for supplying a fog generation device 140 (as seen in FIG. 19) or an ultrasonic transducer (as seen in FIG. 18) which is coupled to the fan through the Hardware control. It should be understood that in the embodiment shown in FIG. 19, the ultrasonic transducer is one example of a fog generation device. Another example of a fog generation device that can produce droplets smaller than 10 microns are high pressure electrically powered diffusers such as a fuel injector.

As used herein, the term "about" refers to an amount that is near the stated amount by about 0%, 5%, or 10%, including increments therein.

Unless otherwise defined, all technical terms used herein have the same meaning as commonly understood by one of ordinary skill in the art to which this disclosure belongs.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

Any element in a claim that does not explicitly state "means for" performing a specified function, or "step for" performing a specified function, is not to be interpreted as a "means" or "step" clause as specified in 35 U.S.C. § 112, -6. In particular, any use of "step of" in the claims is not intended to invoke the provision of 35 U.S.C. § 112, -6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A modular aeroponic garden system comprising:
   a sloped conduit having a first conduit opening and a second conduit opening;
   a reservoir is configured to store a volume of fluid, wherein the second conduit opening is a non-sealed connection with the reservoir such that fluid is configured to return to the reservoir via gravity;
   a plurality of plant support insert holes positioned in the sloped conduit, each of
   the plurality of plant support insert holes configured to receive a plant receptacle containing plant roots of a plant;
   a fog generation device positioned approximate to the first conduit opening and configured to create an atomized fluid comprising a fog cloud of water droplets, wherein at least a portion of the water droplets are less than 10 microns;
   a fan, wherein the fog generation device is coupled to the fan such that the fan is configured to distribute the atomized fluid throughout the sloped conduit to achieve a desired fog saturation within the sloped conduit;
   a hardware control assembly communicatively coupled to the fog generation device and the fan;
   a supplemental nutrient film system, wherein the supplemental nutrient film system uses gravity to deliver the volume of fluid to the plants in the sloped conduit via a delivery conduit in fluid communication with the volume of fluid in the reservoir;
   wherein a first mode of operation the hardware control assembly regulates the atomized fluid of the fog generation device and the fan air movement device such that the atomized fluid is distributed within the sloped conduit to achieve a desired fog saturation; and,
   wherein a second mode of operation the hardware control assembly regulates the volume of fluid of the supplemental nutrient film system out of the reservoir through the delivery conduit and to the sloped conduit back into the reservoir.

2. The modular aeroponic garden system of claim 1, wherein the volume of fluid is a nutrient solution and the atomized fluid is an atomized nutrient solution.

3. The modular aeroponic garden system of claim 1, wherein the first conduit opening is in a sealed connection with an auxiliary conduit branched off the sloped conduit and wherein the fog generation device is positioned within the auxiliary conduit.

4. The modular aeroponic garden system of claim 1, wherein fog generation device comprises a venturi tube, air compressor, a fluid inlet port, an ultrasonic transducer, or other high pressure liquid diffuser.

5. The modular aeroponic garden system of claim 3, wherein the auxiliary conduit comprises at least two auxiliary conduits including a first auxiliary conduit positioned above the sloped conduit and a second auxiliary conduit positioned below the sloped conduit.

6. The modular aeroponic garden system of claim 5, wherein the fan is positioned in the first auxiliary conduit.

7. The modular aeroponic garden system of claim 5, wherein the fog generation device is positioned in the second auxiliary conduit.

* * * * *